Patented Mar. 27, 1923.

1,449,60

UNITED STATES PATENT OFFICE.

RALPH PAGE JUDD, OF CLEVELAND, OHIO.

LUBRICATING COMPOUND.

REISSUED

No Drawing. Application filed May 11, 1920. Serial No. 380,598.

*To all whom it may concern:*

Be it known that I, RALPH PAGE JUDD, a citizen of the United States, residing at Cleveland, in the county of Cuyahoga and State of Ohio, have invented certain new and useful Improvements in Lubricating Compounds, of which the following is a specification.

My invention relates to improvements in lubricating compounds, and more particularly to that class or type of such compounds which are designed and adapted for use in lubricating the bearings of heavy machinery, the improved lubricant being particularly well adapted for use in bearings subjected to great weight and use, as for example heavy bearings or gears in machinery, car axles, and the like.

The improved lubricating compound possesses the desired properties of not gumming, of retaining a uniform consistency, of being nonfrictional, of being cooling and non-congealable in its properties to an extraordinary degree, and consequently is not rendered particularly thin in the summer season or during relatively high temperatures, or in the winter season or during very low temperatures. My improved lubricating compound preferably comprises the following ingredients prepared and combined in the manner hereinafter referred to, and in substantially the following proportions:

Lubricating oil _____ 1 part.
Zinc white _____ 10 parts.

The "zinc white" (oxide of zinc) and the lubricating oil may be of the ordinary commercial form.

In preparing the above, about one hundred pounds of zinc white is mixed or thoroughly incorporated in about five gallons of lubricating oil, or in such proportion as to make a lubricant compound of heavy consistency similar to grease, or of a semi-liquid nature. The zinc white is first reduced to a finely ground or divided condition, and is then added to the lubricating oil, the latter being constantly stirred so that the entire mass will be thoroughly commingled.

After the whole mass has been thoroughly mixed, it is still further reduced to the required consistency by any suitable grinding process, after which the compound will be ready for use or in condition for transportation in proper receptacles.

Under certain conditions other ingredients may be added to the above by correspondingly reducing the proportion of the zinc white. For example, under certain conditions finely divided graphite and asbestos may be added, say by reducing the zinc white to six parts and adding two parts graphite and two parts asbestos, or if desired,—adding four parts of graphite to six parts of zinc white.

Having thus described my improved lubricating compound, and a suitable means for making the same, what I claim and desire to secure by Letters Patent, is,—

1. A lubricating compound, consisting of lubricating oil impregnated with and thickened by finely divided zinc white in substantially the proportion of one part of the former and ten parts of the latter.

2. A lubricating compound, consisting of oil thickened by finely divided zinc white and graphite in substantially equal proportions of the two latter.

3. A lubricant compound, consisting of a lubricating oil thickened and reduced to a heavy consistency by the incorporation and grinding therein of six parts zinc white, two parts graphite, and two parts asbestos.

4. A lubricant compound, consisting of a lubricating oil thickened and reduced to a heavy consistency by the incorporation and grinding therein of finely divided zinc white, graphite, and asbestos.

In testimony whereof I have affixed my signature,

RALPH PAGE JUDD.